Aug. 7, 1945.  R. A. HRABAK  2,381,451
ULTRAVIOLET STERILIZER
Filed Jan. 2, 1943  4 Sheets-Sheet 1
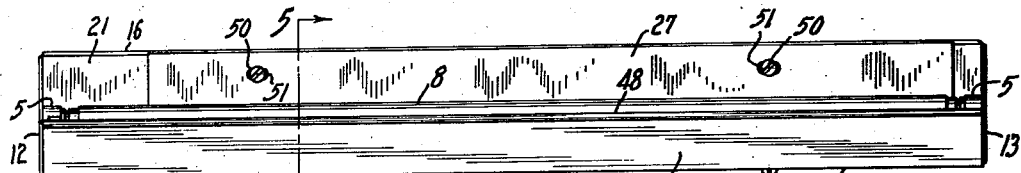
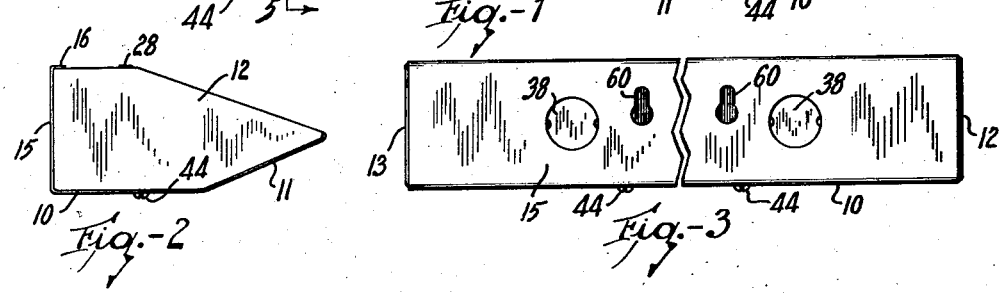
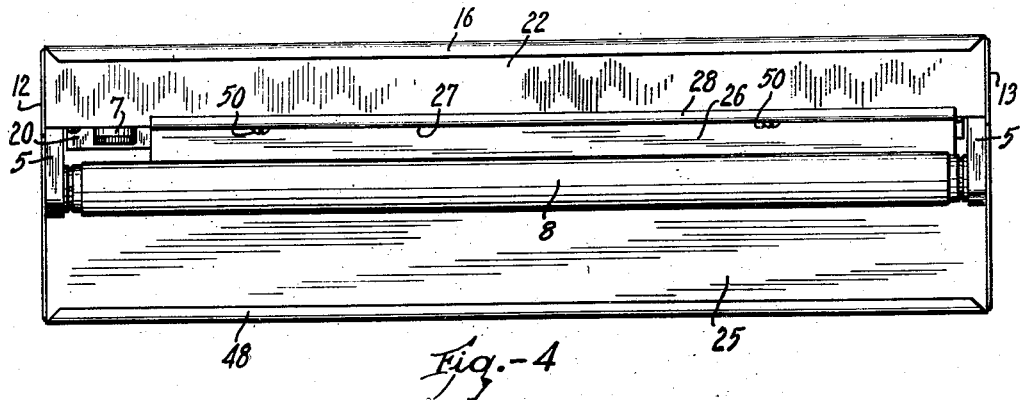
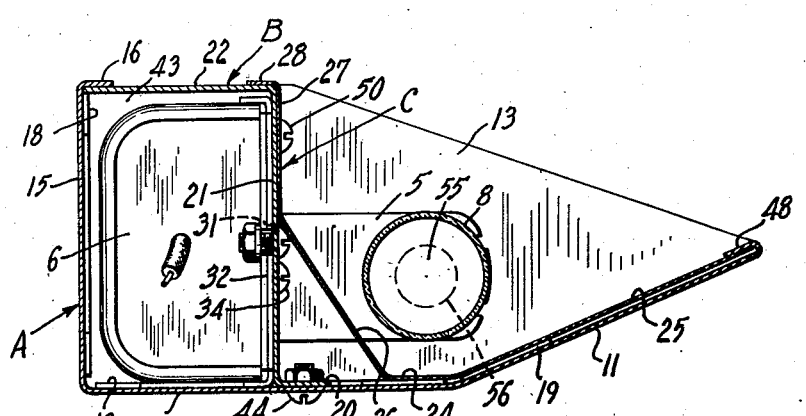
INVENTOR
ROBERT A. HRABAK
BY Hyde and Meyer
ATTORNEYS

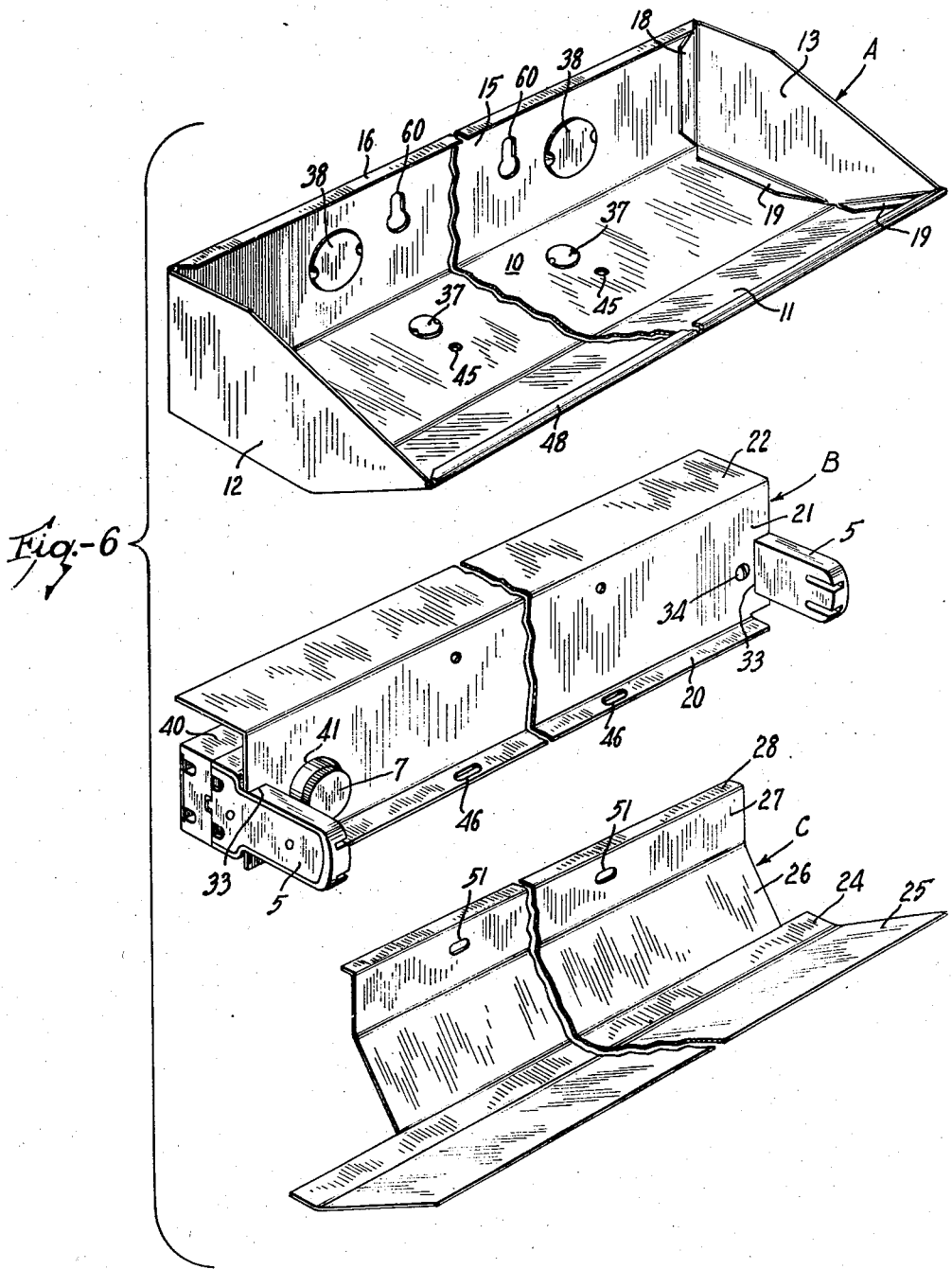

Aug. 7, 1945.   R. A. HRABAK   2,381,451
ULTRAVIOLET STERILIZER
Filed Jan. 2, 1943.   4 Sheets-Sheet 3

INVENTOR
ROBERT A. HRABAK
BY Hyde and Meyer
ATTORNEYS

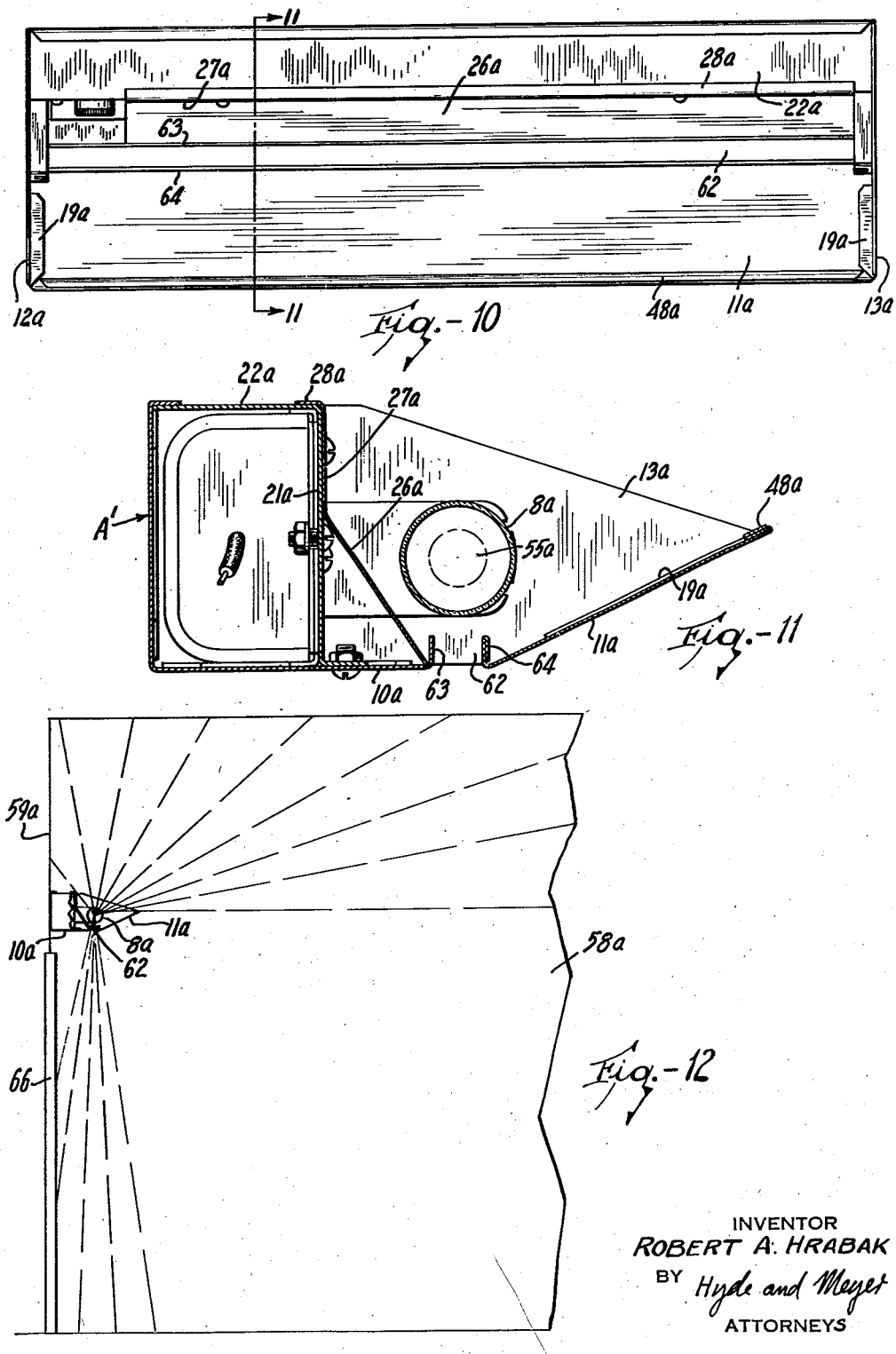

Patented Aug. 7, 1945

2,381,451

UNITED STATES PATENT OFFICE 2,381,451

ULTRAVIOLET STERILIZER

Robert A. Hrabak, Lakewood, Ohio, assignor to The Art Metal Company, Cleveland, Ohio, a corporation of Ohio Application January 2, 1943, Serial No. 471,193

12 Claims. (Cl. 250—88)

This invention relates to ultraviolet sterilizers, and while devices embodying the present invention are suitable for various sterilizing purposes, such devices are particularly useful in effecting air sterilization or sanitary ventilation.

It is now an accepted fact that ultraviolet radiations, particularly in the spectral range 2000 to 3000 Angstrom units, are quite effective in killing bacteria of disease-carrying species. Although ultraviolet radiations within the aforesaid germicidal range form a fractional part of the invisible spectrum originating in the sun, such radiations are largely absorbed in the upper layers of the earth's atmosphere. Inasmuch as extended or prolonged exposure to ultraviolet radiations of germicidal frequency are injurious to the human system, especially to the skin and eyes, it is perhaps fortunate that the sun's germicidal ultraviolet radiations are largely absorbed by the earth's atmosphere. However, lamps for artificially generating ultraviolet radiations of germicidal frequency are now available, lamps which are of conveniently sized tube form, of low operating cost and which are operative from ordinary alternating electric circuits. A substantial proportion of the output of such lamps is ultraviolet energy at a resonance radiation of 2537 A., which is not far removed from the preferred germicidal radiation of approximately 2650 A.

The present invention has for one of its objects the provision of an ultraviolet sterilizer in which is used a lamp of the aforesaid character, said sterilizer having simple and inexpensive means for supporting the ultraviolet lamp, for enclosing the ballast necessary for the operation of the lamp, and for efficiently directing to the desired regions, for effective sterilizing purposes, the ultraviolet radiations emitted by said lamp.

A further object of the present invention is the provision of an ultraviolet sterilizer which, when horizontally mounted on a suitable support, such as a wall of a room or chamber, directs to the region above the ultraviolet generating zone of the lamp of said sterilizer ultraviolet radiations emitted by such lamp. Therefore, by mounting said sterilizer at a height above that of any standing occupants of said room or chamber, say at a height of seven feet, the ultraviolet lamp of said sterilizer is concealed from view, with the consequent avoidance of any direct exposure of said occupants to the ultraviolet radiations emanating from said lamp.

It is at times desirable to provide downwardly passing "curtains" or "screens" of ultraviolet energy which, though invisible, are extremely effective in preventing air-borne bacteria from being carried across a room or chamber, down a corridor or through a door opening. A further object of the present invention, therefore, is the provision of an ultraviolet sterilizer which not only directs upwardly and forwardly a portion of the ultraviolet radiations emitted by the lamp of the sterilizer but which also permits the downward passage, in the form of a curtain or screen, of another portion of the ultraviolet radiations emitted by such lamp. It is, of course, inadvisable for one to remain for any substantial period of time within the path of said downwardly passing curtain or screen of ultraviolet energy, although no injurious effects are experienced by one who briefly pauses in or walks therethrough.

A further object of the present invention is the provision of an ultraviolet sterilizer having structural and manufacturing simplicity, parts which can be readily and conveniently assembled, and which possesses high operating efficiency.

The present invention will be readily understood and many of its practical advantages will be evident from the following description of two embodiments of such invention, as illustrated in the accompanying drawings, in which Fig. 1 is a front elevational view of an ultraviolet sterilizer constructed in accordance with one such embodiment of the invention;

Fig. 2 is an elevational view representative of each end of said sterilizer;

Fig. 3 is a rear elevational view of said sterilizer;

Fig. 4 is a top plan view thereof;

Fig. 5 is a cross-sectional view of the sterilizer, on the line 5—5, Fig. 1;

Fig. 6 is a collective perspective view of the three main parts of the sterilizer, separated to indicate their general relation;

Fig. 10 is a top plan view of an ultraviolet sterilizer constructed in accordance with a second embodiment of the present invention;

Fig. 11 is a cross-sectional view of the sterilizer of Fig. 10, as taken on the line 11—11, Fig. 10; and Fig. 12 is a diagrammatic illustration of a room or chamber in which is mounted on a wall thereof, above a door opening in said wall, an ultraviolet sterilizer of the construction illustrated in Figs. 10 and 11.

Figure 7:
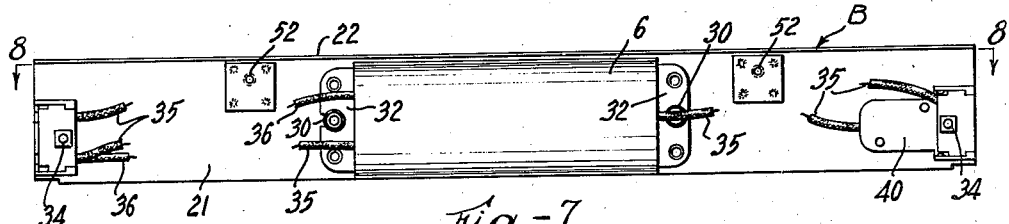
Fig. 7 is a rear elevational view of the middle part of Fig. 6.

Before the two air sterilizers here illustrated are described in detail, it is to be understood that the invention here involved is not limited to the details of construction or the specific arrangement of parts herein illustrated or described, as the invention obviously may take other forms. It also is to be understood that the phraseology or terminology herein employed is for the purpose of description and not of limitation, the scope of the present invention being denoted by the appended claims.

Referring first to the ultraviolet sterilizer illustrated in Figs. 1 to 9 inclusive, it will be evident, particularly from Fig. 6, that such sterilizer comprises three main members, namely, a tray-like member A which receives the other two members; a panel B which carries the lamp holders 5, the ballast 6 and the starter 7 for the ultraviolet lamp 8; and a reflector C for directing to the desired regions the ultraviolet radiations emitted by said lamp. As will be readily understood, the size of these three members, which may be made of any suitable material, such as sheet metal, largely depends upon the size of the ultraviolet lamp which is used therewith, a thirty watt lamp being substantially twice as long as a fifteen watt lamp.

As best shown in Fig. 6, the tray-like member A comprises a base, which here consists of a generally flat rectangular portion 10 and an upwardly and forwardly inclined portion 11 coextensive in length therewith, a pair of upright end walls 12 and 13, each having the rear portions of its top and bottom edges generally parallel and the front portions of such edges converging to substantially a point to meet the front edge of the upwardly and forwardly inclined base portion 11, and an upright rear wall 15 provided at its top edge with a forwardly extending, relatively narrow flange 16. For the fabrication of this tray-like member A, any suitable methods may be employed. As here shown, the base portions 10 and 11 and the rear wall 15, including its top flange 16, are in one piece, having been simply and economically stamped from sheet metal and bent to shape. The end walls 12 and 13 are separate metal stampings, and for securing them in place, welding is here utilized, the end walls having rear tabs 18 for connection to the inner (or front) surface of the rear wall 15, and having bottom tabs 19 for connection to the inner (or upper) surfaces of the base portions 10 and 11.

The panel B is a simple metal stamping having a forwardly extending bottom portion 20, an upright intermediate portion 21, the height of which is substantially coextensive with that of the rear wall 15 of the tray-like member A, and a rearwardly extending top portion 22 substantially parallel with the bottom portion 20. The intermediate and top portions 21 and 22 of this panel are coextensive in length, their length being but slightly less than that of the tray-like member A. The bottom portion 20 of the panel is of somewhat less length, for a purpose to be hereinafter referred to.

The reflector C is a simple sheet metal stamping of generally trough-shaped cross section, the upper surface of said member being plated, polished or otherwise treated for efficient reflection of the ultraviolet radiations emitted by the lamp 8. As best shown in Fig. 6, this reflector comprises a generally flat and relatively narrow bottom portion 24, a forwardly and upwardly inclined front portion 25, an upwardly and rearwardly inclined rear portion 26, the angularity of which is considerably more acute than that of the front portion 25, an upright rear portion 27 at the top of said upwardly and rearwardly inclined rear portion 26, and a relatively short rearwardly extending flange 28 at the top of said upright rear portion 27. The bottom portion 24 and the front portion 25 of the reflector are here coextensive in length, their length being substantially the same as that of the panel portions 21 and 22. The rear portions of the reflector (portions 26, 27 and 28) also are coextensive in length, their length being somewhat less than that of portions 24 and 25 so that the latter portions project beyond the ends of the former portions, there being a somewhat greater projection at the left end than at the right end, as clearly shown in Fig. 6, for a purpose to be hereafter referred to.

Figure 8:
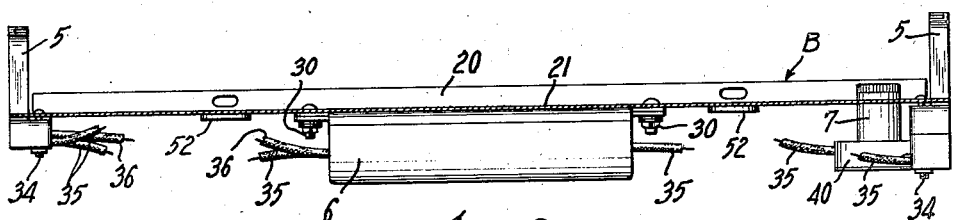
Fig. 8 is a horizontal longitudinal sectional view of such part, on the line 8—8 of Fig. 7.

As will be evident from the accompanying drawings, particularly from Figs. 7 and 8, the panel B carries the two lamp holders 5, upon which is releasably mounted the ultraviolet lamp 8, and the ballast 6 which is necessary in the operation of a lamp of this type. As best shown in Figs. 7 and 8, the ballast 6 lies alongside the rear surface of the upright intermediate panel portion 21, being located substantially midway its ends. For the securement of said ballast to said panel portion 21, bolts 30 are here utilized, said bolts extending through apertures 31, in said panel portion and through apertures in the ballast end lugs 32. As will be evident from Fig. 6, the upright intermediate panel portion 21 is provided with end notches 33 to receive the forwardly projecting portions of the lamp holders 5, the rear portions of said lamp holders having parts extending inwardly toward one another so as to lie behind said panel portion and being bolted or otherwise suitably secured thereto, as at 34. Electric wiring 35, fragmentarily shown in Figs. 7 and 8, electrically connect the ballast 6 and the rear portions of the lamp holders 5 and wires 36, also fragmentarily shown in Figs. 7 and 8, are provided for use in electrically connecting said ballast and one of the lamp holders 5 (the left end one, as viewed in Figs. 7 and 8) to a source of alternating current. For the reception of the usual plug-bearing cord (not shown) to which is electrically connected the wires 36, the tray-like member is provided with a plurality of conveniently located "knock-out" disks, there being two such disks 37 in the base portion 10 of said member and two such disks 38 in the upright rear wall 15 thereof. Any one of such disks may be readily removed to provide an opening for the reception of the cord which enables the sterilizer to be conveniently "plugged in" to a source of alternating current.

As here shown, the starter 7, which is also required in the operation of a lamp of the type here involved, is detachably mounted in an inwardly disposed socket 40 carried by and electrically connected with one of the lamp holders 5, the right end lamp holder, as viewed in Figs. 7 and 8. As will be evident from Figs. 6 and 8, the starter 7 projects forwardly from its socket 40 and extends through an aperture 41 in the upright intermediate portion 21 of panel B. As a result, said starter is readily accessible for convenient connection to and removal from its socket, as will be readily understood.

The panel B is so mounted within the tray-like member A as to form therewith an enclosed chamber 43, within which is located the ballast 6, the wiring 35, 36, the rear end portions of the lamp holders 5, the rear end portion of the starter 7 and the socket 40 in which said starter is mounted. As best shown in Fig. 5, the forwardly extending bottom portion 20 of the panel B rests upon, and is suitably secured to, the base portion 10 of the tray-like member A (the reduced length of said panel bottom portion enabling it to be located between the rear set of end wall tabs 19), and the rearwardly extending top portion 22 of said panel engages the rear wall 15 of said member just beneath the forwardly extending top flange 16 of such rear wall. The chamber 43 thus has generally parallel front and rear walls, generally parallel top and bottom walls and generally parallel end walls, the size of such chamber being ample for the reception of the aforesaid parts located therein. As here shown, bolts 44 are utilized for the securement of the panel B to the tray-like member A, the base portion 10 of the latter member being provided with suitable apertures 45 to receive said bolts and the forwardly extending bottom portion 20 of the panel being provided with longitudinally disposed bolt-receiving slots 46.

The reflector C is assembled with the tray-like member A and its associated panel B in the manner best shown in Fig. 5. As there shown, the generally flat and relatively narrow bottom portion 24 of said reflector overlies the front edge part of the base portion 10 of member A, in front of the panel bottom portion 20 which rests on said base portion. Although said reflector bottom portion 24 may be given a reduced length, if desired, to enable it to also rest upon said base portion 10, the ends of said reflector portion here rest upon the rear set of end wall tabs 19, so that said reflector portion is slightly spaced above said base portion 10. The forwardly and upwardly inclined front portion 25 of said reflector overlies the correspondingly inclined front portion 11 of member A, the two portions generally corresponding in angularity, as shown in Fig. 5. Although the reflector front portion 25 may rest upon the front portion 11 of member A, it is here shown as being slightly spaced therefrom, inasmuch as the ends of said reflector front portion here rest upon the front set of end wall tabs 19. The reflector front portion 25 preferably extends, as here shown, to the front edge of the front portion 11 of member A, and to hold in assembly the front edges of those two portions 25 and 11, the latter portion is here provided with a return bent flange 48 which overlies and thereby securely retains in position the front edge of the reflector front portion 25.

The upwardly and rearwardly inclined portion 26 of the reflector extends from the base portion 24 thereof into contact with upright intermediate panel portion 21, and the upright rear portion 27 of the reflector 15 in contact, throughout its entire area, with said panel portion 21. The height of said upright rear reflector portion 27 is such that it terminates at substantially the top of the correspondingly upright panel portion 21, which enables the rearwardly extending top flange 28 of the reflector to rest upon the correspondingly extending panel top portion 22. The reflector is thus firmly supported on the tray-like member A and on the panel B associated therewith. If desired, the front return bent flange 48 of member A may constitute the sole means for the retention of the reflector, although in the embodiment of the invention here illustrated, the upright rear portion 27 of the reflector is shown as being secured to the corresponding upright panel portion 21. Screws 50 are here utilized for effecting such securement, the reflector portion 27 being provided with longitudinally disposed slots 51 for the reception of said screws and suitable tapping plates 52 being secured to the rear surface of said panel portion 21 into which the screws are threaded. Although the reflector C fits more or less snugly within the tray-like member A, between its front return bent flange 48 and the panel B, assembly and disassembly of the reflector is easily effected. When the upright reflector portion 27 is free of its securement to the upright panel portion 21, the reflector can be raised and tilted slightly so as to enable the front edge of its front portion 25 to be positioned beneath or removed from said return bent flange, in a manner which will be readily understood.

As will be evident from Figs. 1 and 4, the reduced length of the rear reflector portions 26, 27 and 28 permits, at the left end of the sterilizer, the forward projection of the starter 7 and the adjacent lamp holder 5, and permits, at the right end of the sterilizer, the forward projection of the other lamp holder, the two lamp holders lying alongside the end walls 12 and 13 of member A, as shown. Portions 24 and 25 of the reflector have a length substantially coextensive with that of the tray-like member A for maximum reflectivity of the ultraviolet radiations impinging upon such reflector portions.

Inasmuch as the ultraviolet lamp 8 forms no part, per se, of the present invention, it is sufficient to here state that said lamp is of the hot cathode, low voltage tube type, the mercury arc discharge of which is the source of the ultraviolet radiations. A substantial proportion of such radiations are at a resonance radiation of 2537 A., which is not far removed from the preferred germicidal radiation of approximately 2650 A. The cylindrical wall of the lamp is of glass having special wave transmitting characteristics, and the metal end caps of the lamp are provided with the usual paired and longitudinally disposed contact prongs (not shown in the present drawings) for both mechanical and electrical connection of the lamp with the front end portions of its lamp holders 5.

As best shown in Fig. 5, the ultraviolet lamp 8 is here mounted almost directly above the generally flat reflector bottom portion 24. The height of the longitudinal axis of said lamp with respect to the front edge of the sterilizer is of great importance. The operating characteristics of an ultraviolet lamp of the type here utilized are such that the ultraviolet radiations emitted by said lamp originate in a generally cylindrical zone 55 extending between the terminal electrodes of the lamp and indicated in sectional outline in Fig. 5 by the dotted line circle 56. As will be evident from Fig. 5, the longitudinal axis of the generating zone 55 is coincident with the longitudinal axis of the lamp, the diameter of said zone being substantially one-half of the lamp diameter. The lamp is therefore so located in the trough or channel of the reflector C that the front intercepting edge of the sterilizer (the front edge of member A in the present instance) is not lower than a horizontal plane tangential to the top of the lamp "arc" zone 55, and preferably, as here, is located in said horizontal tangential plane.

Although ultraviolet sterilizers embodying the present invention may be used for various sterilizing purposes, the ultraviolet sterilizer of Figs.

Figure 9:
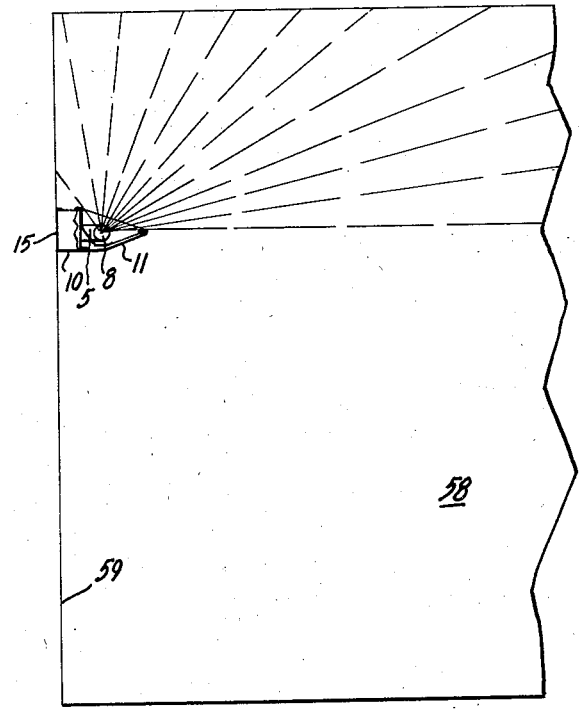
Fig. 9 is a diagrammatic illustration of a room or chamber in which is mounted on a wall thereof, for air sterilization or sanitary ventilation, an ultraviolet sterilizer of the construction illustrated in Figs. 1 to 8 inclusive.

1 to 8 inclusive is particularly useful in sterilizing the air in a room or chamber. For such sterilizing purpose, one or more of such sterilizers may be mounted on the wall or walls of the room or chamber whose air is to be sterilized, the sterilizer or sterilizers being mounted at a height above that of the occupants of said room or chamber when such occupants are in a standing position. In Fig. 9 is diagrammatically illustrated a room or chamber 58 in which is horizontally mounted, on the wall 59 thereof, an ultraviolet sterilizer of the construction heretofore described. As indicated in this view, the ultraviolet radiations emitted by the lamp 8 are directed by the reflector C upwardly and forwardly to the region of the room or chamber lying above a horizontal plane tangential to the top of the generating zone 55 of the lamp 8. Therefore, by mounting the sterilizer at a suitable height, say seven feet, for example, the lamp 8 is shielded from the view of any occupants of the room or chamber 58, and there is thus no possibility of such occupants being directly exposed to the ultraviolet radiations.

Tests recently made indicate that the most efficient method of using bactericidal ultraviolet for air sterilization or sanitary ventilation of a room or chamber is by the direct irradiation of the air in the upper region of said room or chamber. As will be evident from Fig. 9, substantially the entire upper region of the room or chamber 58 is irradiated by ultraviolet emanating from the sterilizer mounted on the wall of said room or chamber, and if the size of said room or chamber requires it, additional sterilizers may be mounted therein, as will be readily understood.

To enable the sterilizer heretofore described to be readily mounted in a horizontal position on a wall or other suitable support, the rear wall 15 of such sterilizer may be provided, as shown in Fig. 6, with suitably spaced apertures 60, the apertures here shown being of the key-hole shape frequently used for hanging purposes.

It is at times desirable not only to irradiate by germicidal ultraviolet the upper regions of a room or chamber but also, to provide a downwardly passing "curtain" or "screen" of germicidal ultraviolet. Such a curtain or screen, directed across a doorway or corridor, is of material aid in effecting air sterilization or sanitary ventilation, as will be readily understood.

In Figs. 10 to 12 inclusive is illustrated an embodiment of the present invention in which provision is made for directing germicidal ultraviolet upwardly and forwardly, for irradiating the upper regions of a room, corridor or the like, and for permitting the passage of germicidal ultraviolet downwardly in the form of a curtain or screen. As here shown, the ultraviolet sterilizer of Figs. 10 to 12 inclusive differs from the sterilizer of Figs. 1 to 9 inclusive primarily in its inclusion of an elongated opening beneath the ultraviolet lamp thereof to enable a curtain or screen of ultraviolet energy to be passed downwardly, in addition to the ultraviolet energy which is directed upwardly and forwardly.

As will be evident from a comparison of Figs. 5 and 11, the tray-like member A' of the sterilizer of Figs. 10 to 12 inclusive is provided along the front edge of its base portion 10a with a full length slot 62, with the consequent disposition of said slot directly below the generating zone 55a of the lamp 8a of said sterilizer. Although the upwardly and forwardly inclined base portion 11a of this sterilizer may be integral with the generally flat base portion 10a thereof, it is preferably made, as here shown, as a separate metal stamping, and suitably secured, as by welding or the like, to the lower surfaces of the upwardly and forwardly inclined bottom tabs 19a of the sterilizer end walls 12a and 13a.

In order to confine within a relatively small occluded angle the ultraviolet radiations passing downwardly through the base slot 62 in the form of a curtain or screen, the generally flat sterilizer base portion 10a is here provided along its front edge—at the rear edge of the base slot 62—with an upstanding flange 63, and the upwardly and forwardly inclined sterilizer base portion 11a is provided along its rear edge—at the front edge of said base slot 62—with a correspondingly upstanding flange 64, the latter flange being of double thickness, if desired, for increased strength and rigidity, by giving such flange a return bend form.

Because of the provision of the base slot 62 in the sterilizer of Figs. 10 to 12 inclusive, the reflector of said sterilizer is of two part character. The rear part of said reflector comprises the rearwardly and upwardly inclined portion 26a (extending to the upright panel portion 21a from the junction of the sterilizer base portion 10a and its upright flange 63, the upright portion 27a which contacts throughout its entire area the aforesaid panel portion 21a, and the rearwardly extending top flange 28a which rests upon the correspondingly extending panel top portion 22a. Although the front part of said reflector may be a separate member positioned to overlie the upwardly and forwardly inclined sterilizer base portion 11a, said front reflector part is here the plated or otherwise suitably treated upper surface of said base portion 11a, the front edge of which is provided with a double return bent flange 48a for increased strength and rigidity. In other respects, the construction of the sterilizer of Figs. 10 to 12 inclusive is identical with the one illustrated in Figs. 1 to 9 inclusive, so that further description of the structural details of the sterilizer of Figs. 10 to 12 inclusive is believed to be unnecessary.

For purposes of illustration, there is diagrammatically shown in Fig. 12 a room or chamber 58a in which is mounted on the wall 59a, above the door opening 66, an ultraviolet sterilizer of the character illustrated in Figs. 10 and 11. As shown in Fig. 12, the upper region of said room or chamber, above a horizontal plane tangential to the top of the generating zone 55a of the lamp 8a of said sterilizer, is irradiated by ultraviolet energy in part directed upwardly and forwardly by the two parts of the reflector of said sterilizer. In addition, a curtain or screen of germicidal ultraviolet passes downwardly to cover the door opening 66 and thereby prevent air-borne bacteria from passing through such opening. It is, of course, inadvisable for one to remain for any substantial period of time within the path of said downwardly passing curtain or screen of ultraviolet energy, although no harmful effects are experienced by one who briefly pauses in or walks therethrough.

From the foregoing descriptions thereof, it will be evident that the two ultraviolet sterilizers here illustrated and described are of simple and inexpensive construction, of compact form, of neat and pleasing appearance and of high operating efficiency. The ballasts of said sterilizers are completely enclosed and thereby concealed from view, and the reflectors of the sterilizers are so arranged as to efficiently direct to the desired regions the ultraviolet radiations impinging thereon. When the sterilizer illustrated in Figs. 1 to 9 inclusive is horizontally mounted, all ultraviolet radiations emanating therefrom pass to the regions above a horizontal plane tangential to the top of the generating zone of the lamp of such sterilizer. When the sterilizer illustrated in Figs. 10 to 12 inclusive is horizontally mounted, not only are the regions above such a plane irradiated by germicidal ultraviolet but also, a curtain or screen of germicidal ultraviolet passes downwardly, to prevent air-borne bacteria from traversing such curtain or screen.

To those skilled in the art to which the present invention relates, other features and advantages of ultraviolet sterilizers embodying such invention will be evident from the foregoing description of two such embodiments.

I claim:

1. An ultraviolet sterilizer, comprising an elongated supporting structure having a chamber and a bottom wall projecting forwardly therefrom, a pair of longitudinally spaced lamp holders carried by said supporting structure and projecting forwardly from the chamber thereof, a tube type ultraviolet lamp extending between and carried by said lamp holders, a ballast for said lamp mounted within said chamber, said forwardly projecting bottom wall having an elongated opening beneath and generally in alignment with the longitudinal axis of said lamp, said opening permitting the downward passage therethrough of some of the ultraviolet radiations emitted by said lamp, and elongated reflector means carried by said supporting structure for directing upwardly and forwardly some of the ultraviolet radiations emitted by said lamp, said reflector means having an upwardly and rearwardly inclined reflecting portion rearwardly of said opening and an upwardly and forwardly inclined reflecting portion forwardly of said opening.

2. An ultraviolet sterilizer, comprising an elongated supporting structure having a bottom wall and spaced and generally upright front and rear walls which define a chamber therebetween, said bottom wall projecting forwardly from said chamber front wall, a pair of longitudinally spaced lamp holders carried by said chamber front wall and projecting forwardly therefrom, a tube type ultraviolet lamp extending between and carried by said lamp holders in spaced relation to said forwardly projecting bottom wall portion, a ballast for said lamp mounted within said chamber, said forwardly projecting bottom wall portion being provided with an elongated opening beneath said lamp and forwardly spaced from said chamber front wall, said opening permitting some of the ultraviolet radiations emitted by said lamp to pass downwardly therethrough, and reflector means carried by said supporting structure for directing upwardly and forwardly some of the ultraviolet radiations emitted by said lamp, said reflector means having a rear reflecting portion extending upwardly and rearwardly from said opening to said chamber front wall and having a front reflecting portion extending upwardly and forwardly from said opening.

3. An ultraviolet sterilizer, comprising an elongated supporting structure having a chamber and a bottom wall portion projecting forwardly therefrom, a pair of longitudinally spaced lamp holders carried by said supporting structure and projecting forwardly from the chamber thereof in spaced and overlying relation to said bottom wall portion, a tube type ultraviolet lamp extending between and carried by said lamp holders, a ballast for said lamp mounted within said chamber, and elongated reflector means carried by said supporting structure for directing upwardly and forwardly ultraviolet radiations impinging thereon, said reflector means having upwardly and oppositely inclined reflecting portions on opposite sides of the vertical plane of the longitudinal axis of said lamp and overlying said bottom wall portion.

4. An ultraviolet sterilizer, comprising an elongated supporting structure having a chamber and a bottom wall portion projecting forwardly therefrom, a pair of longitudinally spaced lamp holders carried by said supporting structure, a tube type ultraviolet lamp extending between and carried by said lamp holders in spaced and overlying relationship relative to said bottom wall portion, a ballast for said lamp mounted within said chamber, and elongated reflector means for said lamp carried by said supporting structure and having upwardly and oppositely inclined reflecting portions at the front and rear of the vertical plane of the longitudinal axis of said lamp, the bottom wall portion of said supporting structure having an upwardly and forwardly inclined front part conforming to and underlying said front reflecting portion.

5. An ultraviolet sterilizer, comprising an elongated supporting structure having a chamber and a bottom wall portion projecting forwardly therefrom, a pair of longitudinally spaced lamp holders carried by said supporting structure, a tube type ultraviolet lamp extending between and carried by said lamp holders in spaced and overlying relation to said bottom wall portion, a ballast for said lamp mounted within said chamber, and elongated reflector means for said lamp carried by said supporting structure and having upwardly and oppositely inclined reflecting portions on opposite sides of a generally flat portion underlying the longitudinal axis of said lamp and overlying said bottom wall portion.

6. An ultraviolet sterilizer, comprising an elongated supporting structure having an enclosed chamber and a bottom wall portion projecting forwardly therefrom, a pair of longitudinally spaced lamp holders carried by said supporting structure and projecting forwardly from the chamber thereof in spaced relation to said bottom wall portion, a tube type ultraviolet lamp extending between and carried by said lamp holders, a ballast for said lamp mounted within said chamber, a starter for said lamp carried by said supporting structure and projecting forwardly from the chamber thereof adjacent one of said lamp holders, and elongated reflector means for the ultraviolet radiations emitted by said lamp, said reflector means having upwardly and oppositely inclined reflecting portions at the front and rear of the vertical plane of the longitudinal axis of said lamp, said front reflecting portion having a length substantially coextensive with that of said lamp and said rear reflecting portion having a reduced length to enable it to be located between said starter and the lamp holder which is more remotely located relative thereto.

7. An ultraviolet sterilizer, comprising an elongated supporting structure having a bottom wall and spaced and generally upright front and rear walls, said bottom wall projecting forwardly from said front wall, a pair of longitudnally spaced lamp holders, a tube type ultraviolet lamp extending between and carried by said lamp holders in spaced and overlying relation to said forwardly projecting bottom wall portion and forwardly of said upright front wall, a ballast for said lamp, and reflector means for said lamp carried by said supporting structure and having upwardly and oppositely inclined reflecting portions at the front and rear of the vertical plane of the longitudinal axis of said lamp and also having an upright rear portion at the top of said inclined rear portion and in contact with said upright front wall.

8. An ultraviolet sterilizer, comprising a tray-like member having a bottom wall and generally upright rear and end walls, said bottom wall having a generally flat rear portion and an upwardly inclined front portion, a panel member arranged within and secured to said tray-like member, said panel member having a front wall resting on said rear bottom wall portion in spaced relation to said upright rear wall and also having a top wall extending rearwardly to said rear wall, said panel member thus cooperating with said tray-like member in the formation of an enclosed chamber, a pair of longitudinally spaced lamp holders extending forwardy through said chamber front wall, a tube type ultraviolet lamp extending between and carried by said lamp holders, a ballast for said lamp mounted within said chamber, and reflector means for said lamp mounted within said tray-like member and having upwardly and oppositely inclined reflecting portions on opposite sides of the vertical plane of the longitudinal axis of said lamp, the front reflecting portion of said reflector means overlying the upwardly and forwardly inclined front portion of the bottom wall of said supporting structure.

9. An ultraviolet sterilizer, comprising a tray-like member having a bottom wall and generally upright rear and end walls, said bottom wall having a generally flat rear portion and an upwardly inclined front portion, a panel member arranged within and secured to said tray-like member, said panel member having a front wall resting on said rear bottom wall portion in spaced relation to said upright rear wall and also having a top wall extending rearwardly to said rear wall, said panel member thus cooperating with said tray-like member in the formation of an enclosed chamber, a pair of longitudinally spaced lamp holders extending forwardly through said chamber front wall, a tube type ultraviolet lamp extending between and carried by said lamp holders, a ballast for said lamp mounted within said chamber, a starter for said lamp extending forwardly through said chamber front wall, and reflector means for said lamp mounted within said tray-like member and having a base portion underlying the longitudinal axis of said lamp, a forwardly and upwardly inclined front portion overlying the front portion of said bottom wall, and an upwardly and rearwardly inclined rear portion extending to said chamber front wall and supported thereby.

10. An ultraviolet sterilizer, comprising an elongated supporting structure having a chamber and a bottom wall projecting forwardly therefrom, a pair of longitudinally spaced lamp holders carried by said supporting structure, a tube type ultraviolet lamp extending between and carried by said lamp holders in spaced and overlying relation relative to said bottom wall, a ballast for said lamp mounted within said chamber, said forwardly projecting bottom wall having an opening beneath said lamp for the downward passage therethrough of some of the ultraviolet radiations emitted by said lamp and elongated reflector means carried by said supporting structure for directing upwardly and forwardly some of the ultraviolet radiations emitted by said lamp, said reflector means having an upwardly and rearwardly inclined reflecting portion rearwardly of said opening and an upwardly and forwardly inclined reflecting portion forwardly of said opening.

11. An ultraviolet sterilizer, comprising a chambered supporting structure of elongated form, a tube type ultraviolet lamp, means supporting said lamp forwardly of the chamber of said supporting structure, a ballast for said lamp in said chamber, and a pair of upwardly facing reflecting portions carried by said structure and spaced apart to provide an elongated opening beneath said lamp, whereby some of the ultraviolet radiations emitted by said lamp pass downwardly through said opening and other ultraviolet radiations emitted by said lamp impinge upon said reflecting portions for forward re-direction thereby.

12. An ultraviolet sterilizer, comprising an elongated supporting structure having a rear wall and a bottom wall provided with an elongated opening in forwardly spaced relation to said rear wall, a tube type ultraviolet lamp, means supporting said lamp above said opening, whereby some of the ultraviolet radiations emitted by said lamp pass downwardly through said opening, and a pair of reflecting portions above the bottom wall of said structure and forwardly of the rear wall thereof, one of said reflecting portions being located rearwardly of said opening and the other of said reflecting portions being located forwardly of said opening and both of said reflecting portions directing upwardly and forwardly the ultraviolet radiations emitted by said lamp which impinge thereon.

ROBERT A. HRABAK.